(12) United States Patent
Sick et al.

(10) Patent No.: US 11,015,302 B2
(45) Date of Patent: May 25, 2021

(54) METHOD, APPARATUS AND SYSTEM FOR PRODUCING A POLYURETHANE SPORTS FLOORING

(71) Applicant: Polytex Sportbelage Produktions-GmbH, Grefrath (DE)

(72) Inventors: Stephan Sick, Willich (DE); Zdenka Finder, Rohrenfels (DE); Ivo Lohr, Kempen (DE)

(73) Assignee: POLYTEX SPORTBELAGE PRODUKTIONS-GMBH, Grefrath (DE)

( * ) Notice: Subject to any disclaimer, the term of this patent is extended or adjusted under 35 U.S.C. 154(b) by 177 days.

(21) Appl. No.: 15/564,064

(22) PCT Filed: Mar. 2, 2017

(86) PCT No.: PCT/EP2017/054946
§ 371 (c)(1),
(2) Date: Oct. 3, 2017

(87) PCT Pub. No.: WO2017/153258
PCT Pub. Date: Sep. 14, 2017

(65) Prior Publication Data
US 2019/0032285 A1    Jan. 31, 2019

(30) Foreign Application Priority Data
Mar. 11, 2016    (EP) .................... 16159887

(51) Int. Cl.
*E01C 13/06*    (2006.01)
*E01C 19/17*    (2006.01)
(Continued)

(52) U.S. Cl.
CPC ............ *E01C 13/065* (2013.01); *C08G 18/10* (2013.01); *C08G 18/7671* (2013.01);
(Continued)

(58) Field of Classification Search
None
See application file for complete search history.

(56) References Cited

U.S. PATENT DOCUMENTS 3,272,098 A    9/1966    Buchholtz et al.

FOREIGN PATENT DOCUMENTS

| DE | 19934743 A1 * | 2/2000 | ............. C08G 18/12 |
| FR | 2030192 A2 * | 10/1970 | ............. E01C 19/17 |

(Continued)

OTHER PUBLICATIONS

L. van der Ven, GDB van Houwelingen, and RR Lamping, "Chemical Characterization of Cross-Linked Polyurethane Films," in Analysis of Paints and Related Materials: Current Techniques for Solving Coatings Problems, edited by Golton, W. (West Conshohocken, PA: ASTM Int'l, 10.1520/STP17852S), 156-1992. (Year: 1992).*

(Continued)

*Primary Examiner* — William P Fletcher, III
(74) *Attorney, Agent, or Firm* — Harness, Dickey & Pierce, P.L.C.

(57) ABSTRACT

A method for producing polyurethane flooring includes providing polyurethane reactive components including a isocyanate component and a polyol component, determining environmental data, determining process parameters for mixing the polyurethane reactive components, wherein the process parameters depend on the environmental data, mixing the foam for the polyurethane flooring by mixing the isocyanate component and the polyol component using a froth foam process with the process parameters, applying a first lane of the liquid foam to a ground, applying a second lane of the liquid foam to the ground, wherein a side edge of the second lane gets in contact with a side edge of the first lane, wherein the process parameter are determined so that the foam of the first lane is not cured before applying the (Continued)

foam of the second lane. Furthermore, the invention relates to an apparatus and a system for producing a polyurethane flooring.

17 Claims, 2 Drawing Sheets

(51) Int. Cl.
| | |
|---|---|
| *E01C 19/46* | (2006.01) |
| *E01C 7/35* | (2006.01) |
| *C08L 75/04* | (2006.01) |
| *C08G 18/10* | (2006.01) |
| *C08G 18/76* | (2006.01) |
| *C08L 75/08* | (2006.01) |
| *E04F 15/22* | (2006.01) |

(52) U.S. Cl.
CPC .............. *C08L 75/04* (2013.01); *E01C 19/17* (2013.01); *E01C 19/174* (2013.01); *E01C 19/178* (2013.01); *E01C 19/46* (2013.01); *C08G 2110/0008* (2021.01); *C08G 2150/60* (2013.01); *C08L 75/08* (2013.01); *E01C 7/356* (2013.01); *E04F 15/225* (2013.01)

(56) References Cited

FOREIGN PATENT DOCUMENTS

| | | | |
|---|---|---|---|
| KR | 100953974 B1 * | 4/2010 | |
| KR | 101299419 B1 * | 8/2013 | |
| WO | WO-2018002203 A1 * | 1/2018 | ......... C08G 18/6629 |

OTHER PUBLICATIONS

Edge. https://www.merriam-webster.com/dictionary/edge?utm_campaign=sd (accessed Jan. 4, 2021). (Year: 2021).*
First Examination Report dated Feb. 5, 2019, issued in corresponding New Zealand Patent Application No. 736024.
International Search Report PCT/ISA/210 for International Application No. PCT/EP2017/054946 dated May 31, 2017.
Written Opinion of the International Searching Authority PCT/ISA/237 for International Application No. PCT/EP2017/054946 dated May 31, 2017.
International Preliminary Report on Patentability dated Sep. 20, 2018 for corresponding International Application No. PCT/EP2017/054946.

* cited by examiner

METHOD, APPARATUS AND SYSTEM FOR PRODUCING A POLYURETHANE SPORTS FLOORING

CROSS-REFERENCE TO RELATED APPLICATIONS

This application is a national phase under 35 U.S.C. § 371 of PCT International Application No. PCT/EP2017/054946 which has an International filing date of Mar. 2, 2017, which claims priority to European Application No. 16159887.5, filed Mar. 11, 2016, the entire contents of each of which are hereby incorporated by reference.

FIELD OF THE INVENTION

The invention relates to a method, an apparatus and a system for producing a polyurethane flooring, especially a sport floor.

BACKGROUND AND RELATED PRIOR ART

Floorings for sport grounds, for example for an athletic track or safety playground, are produced from polyurethane, especially polyurethane foam. The polyurethane is produced by reacting an isocyanate component with a polyol component. After applying the polyurethane foam to the ground, it is smoothed and leveled to a predetermined roughness and level. After the smoothing and leveling process, the polyurethane foam cures.

DE 20 2010 012 456 U1 shows an apparatus for applying a polyurethane floor to a ground. The apparatus is moveable, whereby the basic material is applied to the ground in form of a lane, while the apparatus is moving over the ground. After applying the basic material to the ground, the surface of the basic material is smoothened with a scraper which is located behind the applying unit. The scraper can also remove excess basic material.

SUMMARY OF THE INVENTION

The invention provides an improved method for producing a polyurethane or polyurethane rubber flooring for a sports ground with a predefined foam structure, flexibility, resilience and damping behavior, consistent over the total athletic track or playground surface. The disclosed invention may allow achieving a predefined foam morphology at a wide range of temperature and humidity conditions and even at changing frame conditions during the course of the installation process. For sizeable athletic surfaces, such as surfaces for track or field sports, installation conditions may vary significantly during the installation, e.g. the temperature and amount of sunlight the polyurethane foam may experience can vary. As consequence, different parts of the track may end up with different foam thicknesses, either when enclosed air bubbles expand or collapse with temperature or show an uncontrolled reaction with humidity. This by itself typically leads to an enhanced foaming of the foam layer, resulting in an uneven surface or irregular foam structure. Surface temperatures may vary between 5° C. and 60° C. and typically reach 20° C. to 40° C.

The following describes the invented product as well as an apparatus and a system for producing polyurethane flooring in the independent claims. Embodiments are given in the dependent claims.

In one aspect, the invention provides a method for producing a polyurethane flooring for a sports ground, wherein a polyurethane foam for the polyurethane flooring is applied to a ground in at least two lanes using a vehicle, wherein the at least two lanes are arranged adjacent to each other and a side edge of a first lane is in contact with a side edge of an adjacent second lane of the polyurethane flooring, comprising the following steps:
 providing polyurethane reactive components comprising a isocyanate component and a polyol component,
 determining environmental data,
 determining process parameters for mixing the polyurethane reactive components, wherein the process parameters depend on the environmental data,
 mixing the foam for the polyurethane flooring by mixing the isocyanate component and the polyol component using a froth foam process with the determined process parameters using a mixing unit of the vehicle,
 applying a first lane of the foam to a ground using an application unit connected to the mixing unit, and
 applying a second lane of the foam to the ground using the application unit connected to the mixing unit, wherein a side edge of the second lane gets in contact with a side edge of the first lane.

The process parameters for mixing the polyurethane reactive components are determined so that the foam of the first lane is not cured before applying the foam of the second lane.

The curing time of the polyurethane (PU) foam (also referred to as the "basic material" or "foam" herein) may depend on various conditions: in particular the environmental conditions. For example, high temperatures, direct sunlight or low relative humidity may accelerate the curing process. Otherwise, low temperatures may extend the curing process. If the curing process is to short, the basic material of the first lane may be cured before applying the adjacent second lane so that a firm bonding and a smooth surface cannot be guaranteed. On the other hand, the curing process should not take too much time in order to avoid damages of the surface during the curing process.

The method according to the invention may have the advantage that the process may be modified depending on the environmental conditions. Therefore, the curing process can be influenced so that the curing time is within defined boundaries which are determined by the environmental conditions. Air is incorporated by either whisking air into the polyurethane mass or by compression of the polyurethane foam and by allowing free expansion of the compressed foam. In an embodiment the polyurethane foam is generated by the oscillation of a tube or pipe reactor fed with the PU mass and compression and expansion effects are achieved by the oscillation of the tube.

In an embodiment the used PU formulation comprises an MDI based NCO terminal prepolymer, produced from an isomeric mixture of 2,4'; 4,4' and 2,2' MDI monomer based prepolymer with an NCO content of 1.5-18 weight % with 2,2 MDI between 1 and 40%. The preferred polyol being either standard or endcapped, activated polyether polyols like polypropylene glycol of the average molecular weight ranging from 100 up to 6000. In a very preferred embodiment, a high molecular weight primary hydroxyl terminated diol of the molecular weight 2000-4000 with hydroxyl numbers of 25-60 mg KOH/g is used to produce the NCO terminal prepolymer. As hydroxyl terminal component a branched castor oil based polyol can be used, which typically is generated by a thermal and encymatic transesterification process reacting with a ketone resin. Reactivity may be adjusted by using typically suitable metal-organic catalyst like e.g. dibutyltin or dilaurate.

In another embodiment the NCO terminal prepolymer and the OH terminal polyol are chilled at 10-25° C. and pumped in a prefixed ratio through a static mixer, transported to a foam mixing unit—as e.g. the aforementioned oscillating reaction pipe.

To avoid undesired excessive foaming a water-adsorbing additive like a zeolite or any other molecular sieve or desiccant can be used. In an embodiment the desiccant can have a pore size of 3-5 angstrom and is used in the range of 0.1-3 weight % of the polyol weight, in a very preferred embodiment between 0.5-2% of the polyol weight.

In order to improve the controlling of the curing time, additional polyurethane forming ingredients may be added to the foam. The type and the quantity of the polyurethane forming ingredients depends on the measured environmental data and wherein the polyurethane forming ingredients are chosen so that the foam of the first lane is not cured before applying the foam of the second lane. Furthermore, polyurethane forming ingredients may be used in order to customize the characteristics of the polyurethane flooring.

The additional polyurethane forming ingredients may include one or more of the following: additives, frothing agents, compressed air or activators or other known additives for polyurethane floorings.

The produced foam may be stabilized by a silicone high sheer foam stabilizer enhancing cell stabilization at foam densities of 200-400 kg/m$^3$, preferably 100-600 kg/m$^3$. In an embodiment the silicone foam stabilizer is used at 0.1%-4 weight %, preferably between 1% and 2%. Furthermore diverse pigments and fillers can be used like calcium carbonate, bentonite to stabilize the foam further and strengthen its structure.

In an embodiment the foam layer is just one layer of a construction with several layers. The foam layer may comprises rubber granulates, which for example could be, but is not limited to: styrene butadiene rubber (SBR) or sulphur cured ethylene propylene diene monomer rubber (EPDM) granulates. The rubber granulates may render in combination with the foam high elastomeric resilience and good damping properties (achieving a shock absorbance of e.g. >40% at temperatures of 15° C.

The environmental data may comprise one or more of the following: the air temperature, the ground temperature, the relative humidity, and/or other climate data, which influence the curing time of the foam. For example, a weather forecast and/or the time of day may be incorporated in order to determine higher temperatures and/or lower humidity in advance. Furthermore, the environmental data may comprise the size and the geometry of the flooring in order to determine the time needed for applying a second lane adjacent to the first lane. Furthermore, the thickness of the polyurethane flooring may be taken into account.

The environmental data may be measured by a sensor. For determining the environmental data, a single sensor may be sufficient. In a further embodiment, the environmental data may be measured at various position of the ground. This may have the advantage that the environmental data may be determined with a higher reliability. A single sensor may be positioned at a wrong position, for example in a shadow. Using multiple sensors may reduce the risk of incorrectly measured environmental conditions.

For example, stationary sensors for environmental data may be positioned before producing the polyurethane flooring. This may have the advantage that the conditions of various positions of the field to be coated with the polyurethane flooring may be determined before the application process starts and enable pre-planning of the process parameters. The process parameters and the type and the quantity of polyurethane forming ingredients may be adapted to the highest measured temperature or may be chanced during the process in order to adapt the curing time to different areas of the flooring with different temperatures. Furthermore, a temperature map may be created, in order to adapt the process parameter, the type, and the quantity of polyurethane forming ingredients depending on the environmental data of this map and the current position. The temperature map may be measured or even received from a meteorological service.

Alternatively or in addition, the environmental data may be measured using sensors incorporated into the vehicle. This may have the advantage that the environmental data may be measured at the position on which the foam is applied so that the environmental conditions are measured at the time of applying the foam.

Furthermore, the environmental data may be continuously measured and the process parameters and the type and the quantity of polyurethane forming ingredients may be adjusted continuously to the measured environmental data. This may have the advantage that the process may be modified to changing environmental conditions.

In another embodiment, the process parameters are entered into a control unit. The control unit is configured to control the mixing of the foam to adjust a curing time of the polyurethane foam in response to changes in the environmental data using the process parameters.

In a further embodiment, the measured environmental data may be stored in the memory of a control system and the process parameters and the type and the quantity of polyurethane forming ingredients are adjusted depending on the stored environmental data.

In addition, the position and/or the speed of an apparatus for applying the foam to the ground may be measured and the process parameters and the type and the quantity of polyurethane forming ingredients are adjusted depending on the position and the speed of the vehicle.

In a further aspect of the invention, an apparatus for producing a polyurethane flooring for a sports ground to a ground, particularly with a method according to the invention. The apparatus may be a vehicle. The apparatus comprises tanks for polyurethane reactive components comprising a isocyanate component and a polyol component, a mixing unit connected to the tanks for the isocyanate component and the polyol component with ducts. The mixing unit comprises means for producing a polyurethane froth foam. Valves are provided for dosing the quantity of the isocyanate component and the polyol component flowing into the mixing unit. Furthermore, the apparatus comprises an application unit connected to the mixing unit for applying the mixed foam to the ground, a drive unit for driving the apparatus relative to the ground, a levelling unit for levelling the surface of the applied foam and a control unit. The control unit is connected to the valves and is configured for measuring and/or receiving environmental data, determining process parameters for mixing the polyurethane reactive components depending on the environ-mental data and for controlling the valves, the drive unit and the levelling unit depending on determined process parameters.

The apparatus may be provided with at least one tank for at least one additional polyurethane forming ingredient. The tank is connected to the mixing unit with a duct. The tank comprises a valve connected to the control unit. The control unit is configured for controlling the valve depending on the measured and/or received environmental data.

The apparatus may further comprise a positioning system, such as a global positioning system, for determining the position of the apparatus and/or a unit for determining the side edges of a lane of the foam applied to the ground. The control unit may be configured for controlling the drive unit depending on the determined position of the apparatus and/or the determined position of the side edges of the foam of the lane applied to the ground.

In another embodiment, the width of a lane is limited to the dimensions of the apparatus. For producing flooring with a width larger than the dimensions of the apparatus, several lanes may be produced one after another. A second lane is applied so that a side edge of the second lane is in contact with a side edge of the first lane. The basic material of the second lane is bond firmly to the material of the first lane. In order to provide a smooth, even surface of the polyurethane flooring and to ensure a firm bonding of the material of two adjacent lanes, the basic material of the first lane should not be completely cured when applying the second lane.

In another embodiment, the control unit is configured to control the mixing of the foam to adjust a curing time of the polyurethane flooring by modifying the process parameters in response to changes in the environmental data.

In another embodiment, the control unit is further configured to adjust the curing time such that the curing time is longer than a minimum curing time. The minimum curing time is determined using the environmental data.

In another embodiment, the apparatus further comprises a temperature control unit, wherein the isocyanate component and the polyol component are held within a predetermined temperature range by the temperature control unit before being mixed in the mixing unit.

In another embodiment, the predetermined temperature range is between 5° C. and 35° C.

In another embodiment, the predetermined temperature range is more preferably between 10° C. and 25° C.

In a further aspect of the invention, a system for producing a polyurethane flooring for a sports ground is provided, particularly with a method according to the invention. The system comprises an apparatus according to the invention and at least one sensor for measuring environmental data, wherein the sensor is connected to the control unit of the apparatus.

The sensor may be attached to the apparatus.

Alternatively, the sensor may be stationary positioned on the ground and comprises a transmitter for transmitting the environmental data to the control unit. The control unit comprises a receiver for receiving the environmental data from the sensor.

BRIEF DESCRIPTION OF THE DRAWINGS

In the following embodiments of the invention are explained in greater detail, by way of example only, making reference to the drawing, in which.

DETAILED DESCRIPTION

Figure 1:
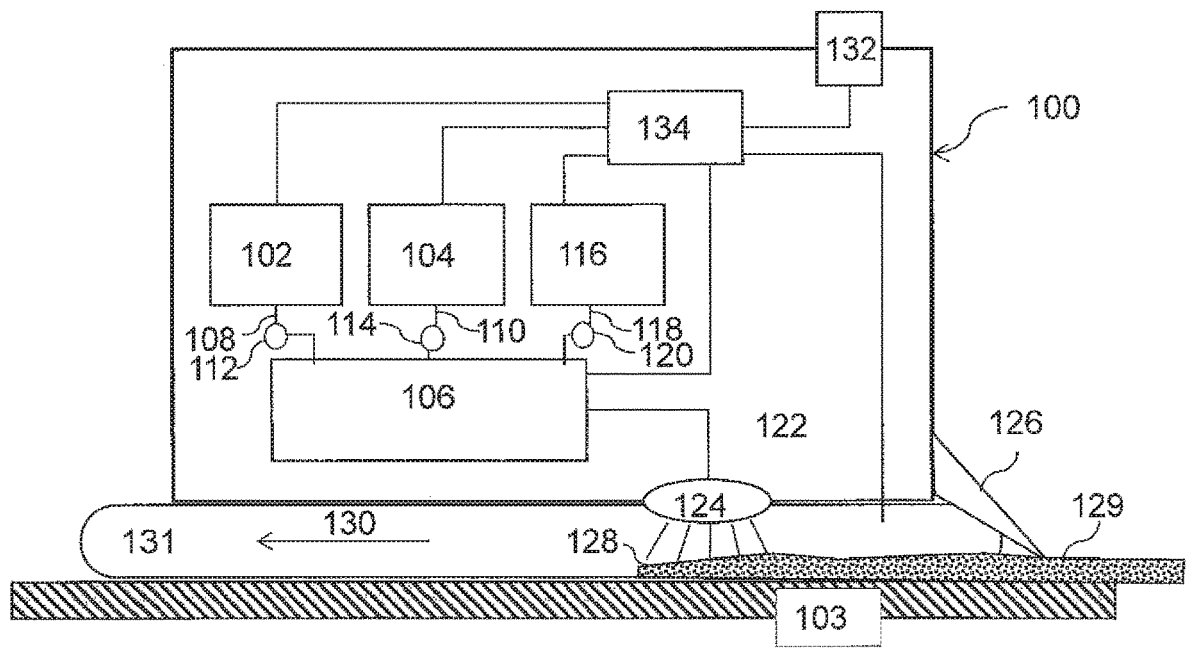
FIG. 1 shows a schematic drawing of an apparatus for applying a polyurethane flooring on a ground.
Figure 4:
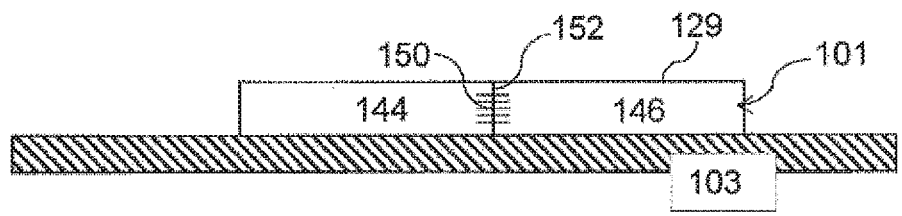
FIG. 4 shows a cross section of the polyurethane flooring applied on a ground.

FIG. 1 shows a schematic drawing of an apparatus 100 configured for producing and applying a polyurethane flooring 101 a ground 103 (see FIG. 4).

Polyurethane floorings 101 consist essentially of two reactive components, an isocyanate component and a polyol component. Depending on the desired properties of the flooring, various polyurethane forming ingredients, for example chemical additives, compressed air or other additives may be added.

The additives may influence the mechanical properties of the flooring, the resistance to climate conditions, the water absorbency or other characteristics of the flooring.

Furthermore, additives may influence the processing properties, for example the viscosity or the curing time of the liquid polyurethane. Additives used might be typically foam stabilizers as e.g. high sheer resistant silicone foam stabilizers.

Furthermore, catalysts might be used to enhance the reactivity of the mixture between the NCO terminal prepolymer and/or the polymeric isocyanate on one hand and the higher molecular weight polyol. Moreover, pigments and UV stabilizers might be used.

The apparatus 100 comprises tanks 102, 104 for the basic materials of the polyurethane, wherein the first tank 102 contains a polyol component and the second tank 104 contains an isocyanate component. Both tanks 102, 104 are connected with ducts 108, 110 to a mixing unit 106 in which the components are mixed to a foam 128 for the polyurethane flooring. Each duct 108, 110 comprises a valve 112, 114 for dosing the amount of polyol respectively isocyanate which flows from the respective tank 102, 104 to the mixing unit 106. The ducts 108, 110 may comprise a supply unit, for example a pump. The apparatus may be a vehicle.

Furthermore, the apparatus 100 comprises an additives tank 116 for a polyurethane forming ingredient which is connected with a duct 118 to the mixing unit 106. The duct comprises a valve 120. The apparatus 100 may comprise various additives tanks for various additives depending on the desired number of additives to be added to the foam 128 for the polyurethane flooring.

The mixing unit 106 comprises means for producing a polyurethane foam. The mixing unit 106 is connected with a duct 122 to an application unit 124 which is configured for applying the foam 128 to a ground 103. The application unit 124 may comprise a various number of nozzles for applying the foam 128 to the ground 103. The nozzles may be spaced out evenly over the entire width of the application unit 124.

Furthermore, the apparatus 100 comprises a levelling unit 126 for levelling and smoothing the applied foam 128. The levelling unit 126 may be a scraper, which is located in a drive direction 130 of the apparatus 100 behind the injection unit 124. The leveling unit 126 is configured for smoothing the surface 129 of the applied foam and or for taking up excess foam.

The apparatus comprises a driving unit 131 for driving the apparatus 100 in the drive direction 130.

Furthermore, a sensor 132 for measuring environmental conditions may be provided as part of the apparatus 100. The sensor 132 may be configured for measuring the air temperature, the ground temperature, the relative humidity or other climate conditions. Various sensors for determining various environmental data may be provided.

The valves 112, 114, 120, the mixing unit 106, the application unit 124, the levelling unit 126, the drive unit and the sensor 132 are connected to a control unit 134. The control unit 134 is configured for receiving environmental data measured by the sensor 132 and to control the valves 112, 114, 120, the mixing unit 106, the application unit 124, the drive unit 131 and the levelling unit 126 depending on the received environmental data.

Figure 2:
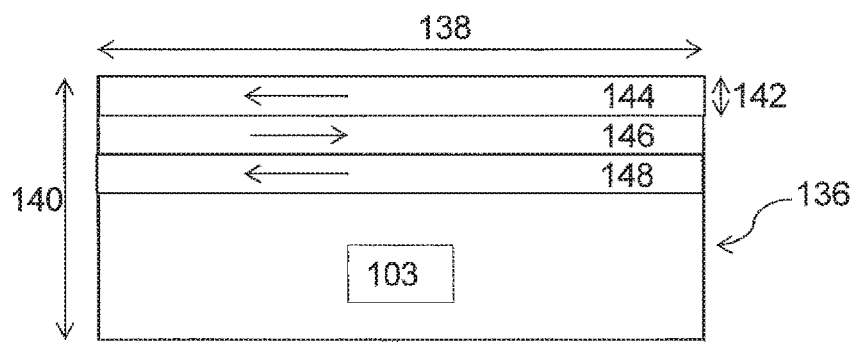
FIG. 2 shows a schematic drawing of a first embodiment of a method for applying a polyurethane flooring to a ground.
Figure 3:
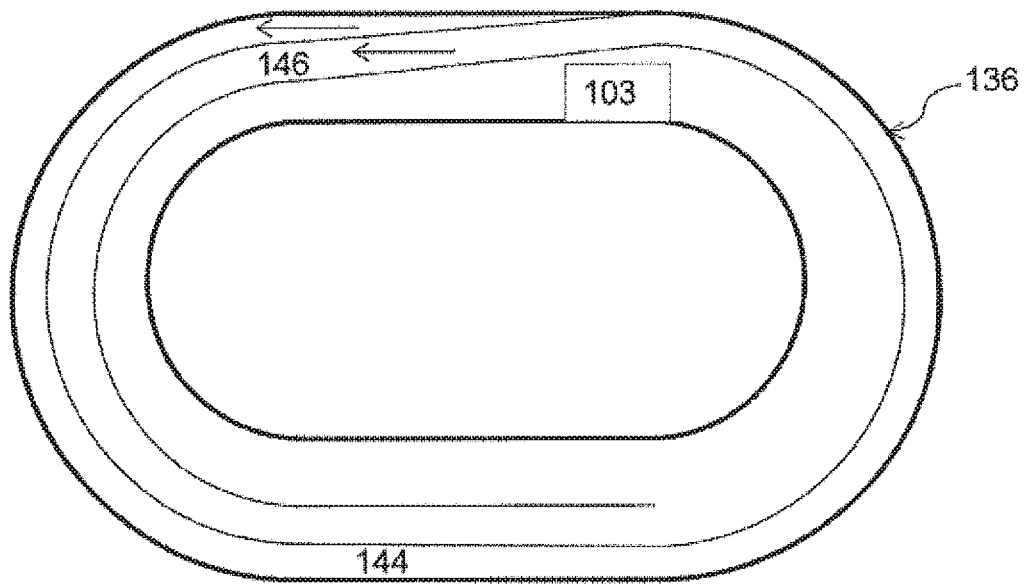
FIG. 3 shows a schematic drawing of a first embodiment of a method for applying a polyurethane flooring to a ground.

A first embodiment of a method for applying foam for a polyurethane flooring to a sports ground 103 with the above mentioned apparatus is schematically shown in FIG. 2.

In this embodiment, the ground 103 to be applied with a polyurethane flooring is a rectangular sports ground 136 with a length 138 and a width 140. The ground 103 may be prepared, for example levelled and concreted. The apparatus 100 is configured for applying a lane of the foam 128 having a width 142 which is smaller than the width 140 of the sports ground 136. Therefore, the foam is applied to the ground 103 in lanes 144, 146, 148, wherein adjacent lanes 144, 146, 148 are in contact with each other. Preferably, the foam of a second lane 146 which is applied after the foam of a first lane 144 is connected immediately to the foam of the first lane 144 (see FIG. 4) so that a side edge 150 of the first lane 144 is in contact with the side edge 152 of the second lane 146. The levelling unit 126 is wider in shape than the injection unit 124 so that the leveling unit 126 can smooth the transition from the first lane 144 to the second lane 146.

A second embodiment of a method for applying foam for a polyurethane flooring to a sports ground 103 is schematically shown in FIG. 2. In this embodiment, the ground is an oval track field. The apparatus 100 drives around the field applying the foam 128. The second lane 146 connects at the starting point of the first lane 144, whereby the apparatus 100 moves radially inwards so that the path of motion of the apparatus 100 is spiral.

Independently from the geometry in which the foam is applied to the ground, the foam of the first lane 144 should be in a liquid state when applied the adjacent second lane 146. If the foam 128 of the first and the second lanes 144, 146 are both liquid respectively not cured, the foam of both lanes 144, 146 can be mixed up in the contact zone and/or bond firmly together to improve a continuous polyurethane flooring. Furthermore, the levelling unit 126 can smooth the surface 129 in order to produce an even and smooth surface.

Therefore, it is important to avoid that the foam of the first lane 144 is cured before the foam of the second lane 146 is applied. Especially in hot, dry climate conditions and floorings with large expansions the curing process may have started before the second lane is applied to the ground 103.

To avoid an early curing process, the mixture of the foam and the process parameters of the mixing process can be customized to the environmental conditions. The environmental data are measured by the sensor 132 and sent to the control unit 134. The control unit 134 controls the valves 112, 114, 120 so that the desired mixture of polyol, isocyanate and additives is mixed. Furthermore, the amount of compressed air or $CO_2$ in the foam or other process parameters can be adjusted by controlling the mixing unit 106.

Furthermore, the control unit may take into account the geometry of the ground, the planned path, respectively the length of each lane 144, 146, 148, the thickness of the polyurethane flooring and the speed of the apparatus 100 into the process of determination the mixture of the foam 128 in order to ensure that the foam of a first lane 144 is not cured before the foam of the second lane 146 is applied.

In the described embodiment, the sensor 132 is attached to the apparatus 100 so that the environmental conditions are measured at the position of the apparatus 100. Therefore, the mixture and the process parameters can be adapted continuously to the current conditions so that a constant curing time of the foam 128 can be achieved.

Alternatively or in addition, stationary sensors can be used. Stationary sensors can be positioned at various positions of the ground 103 in order to achieve the environmental conditions in advance in order to customize the mixture of the foam to these conditions. In these embodiments, the sensors 132 may be connected to the control unit 134 by any wireless connection, for example a radio connection or a WLAN-connection, whereby the sensor 132 comprises a transmitter and the control unit 134 comprises a receiver.

If various sensors 132 are distributed at different positions of the ground, this may have the advantage, that the environmental data of an unfavorable positioned sensor 132 can be compensated for. For example, one sensor can be positioned in shadow so that the temperature of this sensor is lower than the temperature of the remaining ground. For example, the mixture can be customized such that the process parameters enable the deposition of the foam using the worst measured environmental conditions of the sensors. For example the highest measured temperature. Alternatively, a map of the environmental data may be created and the mixture and the process parameters are customized continuously on the basis of this map and the current position of the apparatus 100.

Furthermore, additional environmental data may be taken into account, for example a weather forecast, a time of the day or the relative humidity. Due to the weather forecast and the time of day a rising of the temperatures during the process may by predicted in order to adapt the mixture and the process parameters to the rising temperatures. For example, additional environmental data may be received from a meteorological service.

The environmental data may be measured at the beginning of the process or continuously in order to adjust the mixture and the process parameters continuously to the environmental data. The environmental data may be stored to a memory of the control unit 134. The stored data may be used to improve the prediction of temperatures or to control the current mixing process.

In a further embodiment, the position and/or the speed of the apparatus 100 may be determined by additional sensors. By this information, the control unit 134 may calculate the time between applying the first and the second lane, calculate the required curing time and adapt the mixture and the process parameters of the foam.

LIST OF REFERENCE NUMERALS 100 apparatus
101 polyurethane flooring
102 tank
103 ground
104 tank
106 mixing unit
108 duct
110 duct
112 valve
114 valve
116 additives tank
118 duct
120 valve
122 duct
124 application unit
126 levelling unit
128 foam
129 surface
130 drive direction
131 drive unit
132 sensor
134 control unit
136 sports ground
138 width of the sports ground 140 length of the sports ground
142 width of the application unit
144 first lane
146 second lane
148 third lane
150 side edge of the first lane
152 side edge of the second lane

The invention claimed is:

1. A method for producing a polyurethane flooring for a sports ground, wherein a polyurethane foam for the polyurethane flooring is applied to a ground in at least two lanes using a vehicle, wherein the at least two lanes are arranged adjacent to each other, wherein each lane of polyurethane foam has a first surface in contact with the ground, a second surface opposite the first surface and side edges joining the first surface and second surface, and wherein a side edge of a first lane is in contact with a side edge of an adjacent second lane of the polyurethane flooring, comprising the following steps:
providing polyurethane reactive components comprising an isocyanate component and a polyol component in a tank of the vehicle;
determining environmental data at the sports ground, wherein the determining environmental data at the sports ground comprises at least one of measuring the environmental data via at least one sensor at the sports ground and receiving the environmental data from a meteorology service;
determining process parameters for mixing the polyurethane reactive components, wherein the process parameters depend on the environmental data, wherein the environmental data comprise one or more of air temperature, ground temperature or relative humidity;
mixing the foam for the polyurethane flooring by mixing the isocyanate component and the polyol component using a froth foam process with the process parameters by a mixing unit of the vehicle, wherein the process parameters comprise one or more of whisking air into the polyurethane foam, compression and expansion of the polyurethane foam, adding frothing agents to the polyurethane foam or adding compressed air to the polyurethane foam;
applying the first lane of the foam to the ground using an application unit connected to the mixing unit;
applying the second lane of the foam to the ground, after applying the first lane of the foam to the ground, using the application unit connected to the mixing unit, wherein the side edge of the second lane is in contact with the side edge of the first lane,
wherein the process parameters are determined so that the foam of the first lane is not cured before applying the foam of the second lane, and wherein the process parameters are adjusted based on a length of the lanes, a speed of the vehicle applying the polyurethane foam to the ground and a thickness of the polyurethane flooring.

2. The method of claim 1, wherein polyurethane forming ingredients added to the foam comprise one or more of the frothing agents, the compressed air, additives or activators, wherein a type and a quantity of the polyurethane forming ingredients depends on the measured environmental data and wherein the polyurethane forming ingredients are chosen so that the foam of the first lane is not cured before applying the foam of the second lane.

3. The method of claim 2, wherein the environmental data are continuously measured and wherein the process parameters and the type and quantity of the polyurethane forming ingredients are adjusted continuously to the measured environmental data.

4. The method of claim 2, wherein the measured environmental data are stored in a memory of a control unit and the process parameters and the type and quantity of polyurethane forming ingredients are adjusted depending on the stored environmental data.

5. The method of claim 2, wherein a position and/or the speed of the vehicle for applying the foam to the ground is measured and the process parameters and the type and quantity of polyurethane forming ingredients are adjusted depending on the position and the speed of the vehicle.

6. The method of claim 1, wherein the environmental data further comprises any one of the following: a weather forecast, time of day, or combinations thereof.

7. The method of claim 1, wherein the environmental data are measured at various positions of the ground.

8. The method of claim 1, wherein at least a portion of the environmental data is measured by the vehicle for applying the foam to the ground.

9. The method of claim 1, wherein the process parameters are entered into a control unit, wherein the control unit is configured to control the mixing of the foam to adjust a curing time of the foam based on the process parameters in response to changes in the environmental data.

10. The method of claim 9, further comprising determining a minimum curing time using the environmental data, and wherein the control unit is configured to adjust the curing time such that the curing time is longer than the minimum curing time.

11. The method of claim 1, wherein the mixing unit comprises an oscillating tube fed with the isocyanate component and the polyol component, and wherein the oscillating tube is configured to cause the foaming of the polyurethane flooring by effects of the compression and expansion.

12. The method of claim 1, wherein the foam comprises an MDI based NCO terminal prepolymer which is a reaction product of the isocyanate component and the polyol component, wherein the MDI based NCO terminal prepolymer is produced from an isomeric mixture of 2,4'; 4,4' and 2,2' MDI monomer based prepolymer with an NCO content of between 1.5 and 18 weight % and with 2,2 MDI between 1 and 40% by weight.

13. The method of claim 12, wherein a high molecular weight primary hydroxyl terminated diol of molecular weight 2000-4000 with hydroxyl numbers of 25-60 mg KOH/g is used to produce the NCO terminal prepolymer.

14. The method of claim 12, wherein the NCO terminal prepolymer and the polyol component are held within a predetermined temperature range and pumped in a prefixed ratio through a static mixer before being turned into the foam in the froth foam process, wherein the predetermined temperature range is between 5° C. and 35° C.

15. The method of claim 12, wherein the NCO terminal prepolymer and the polyol component are held within a predetermined temperature range and pumped in a prefixed ratio through a static mixer before being turned into the foam in the froth foam process, wherein the predetermined temperature range is between 10° C. and 25° C.

16. The method according to claim 1, wherein the method further comprises mixing rubber granulates into the foam before applying the foam to the ground.

17. The method of claim 1, wherein the sports ground has a length and a width, wherein the vehicle is configured for applying a lane of foam to the ground having a lane width which is smaller than the width of the sports ground, and wherein applying the second lane of the foam to the ground, after applying the first lane of the foam to the ground, comprises applying the second lane of the foam to the ground over the length of the sports ground, after applying the first lane of the foam to the ground over the length of the sports ground.

* * * * *